Aug. 28, 1928.
C. K. PORTER
1,682,348
CLUTCH CONTROLLER
Filed April 21, 1927   2 Sheets-Sheet 2
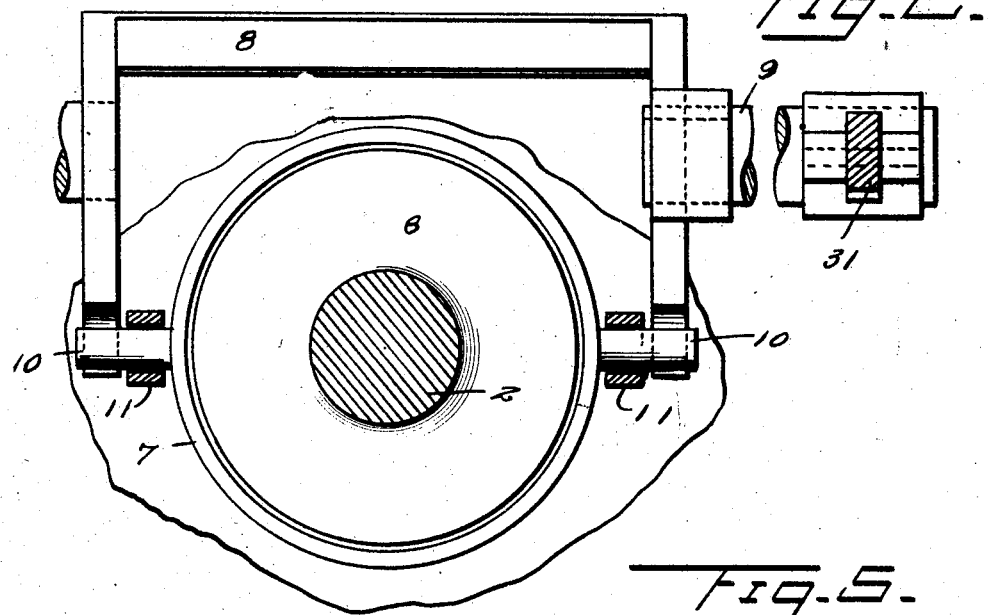
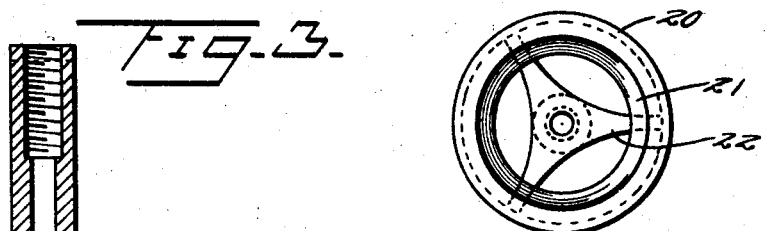
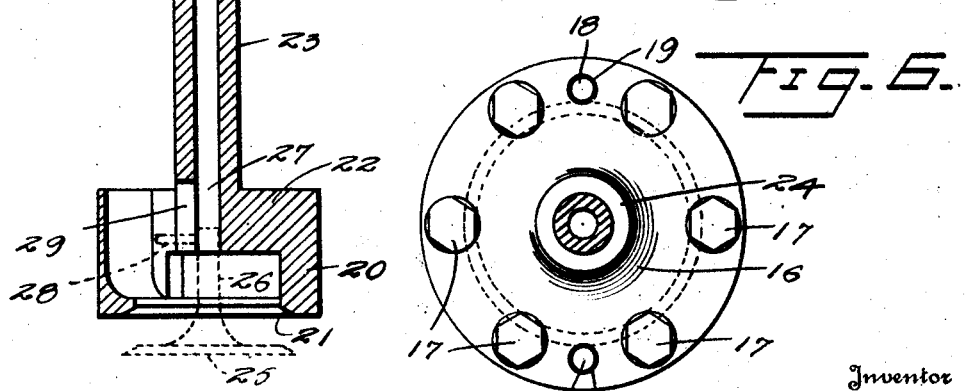
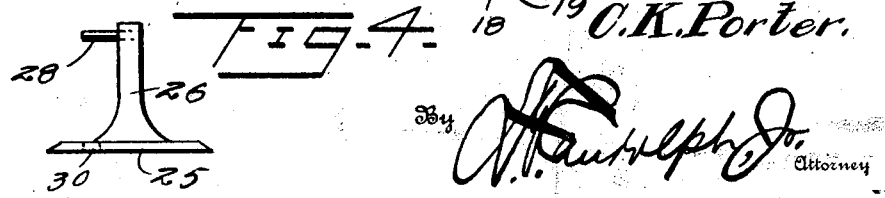
Inventor
C. K. Porter.

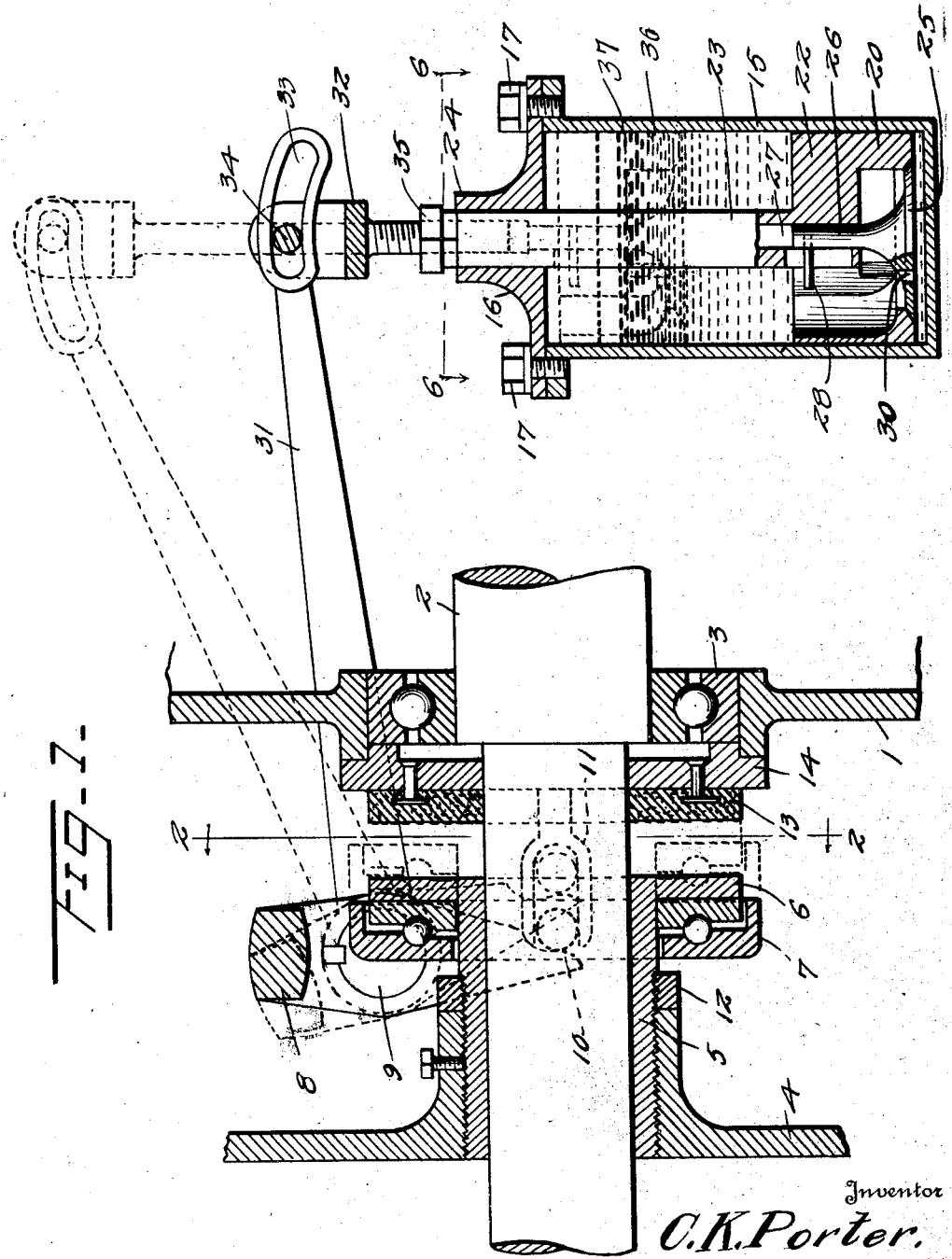

Patented Aug. 28, 1928.

1,682,348

UNITED STATES PATENT OFFICE.

CLARENCE K. PORTER, OF LANSING, KANSAS, ASSIGNOR OF ONE-HALF TO CATHERINE A. PORTER, OF TULSA, OKLAHOMA.

CLUTCH CONTROLLER.

Application filed April 21, 1927. Serial No. 185,614.

This invention relates to and has for one of its objects the provision of a novel, simple and highly efficient device adapted to control a clutch in such manner as to prevent the sudden engagement thereof, whereby to eliminate the extremely heavy stresses on machinery and the unpleasant jerks and shocks to the occupants of automobiles incident to the careless and unskilful manual engagement of clutches, and whereby to ease the strain of driving automobiles especially in heavy traffic.

With the foregoing and other objects in view, the invention consists in the construction, combination and arrangement of parts hereinafter fully described and claimed, and illustrated in the accompanying drawings, wherein:—

Figure 1 is a sectional view taken on a plane extending vertically and centrally through a portion of a disk clutch and my improved controller therefor, Figure 2 is a sectional view taken on the vertical plane indicated by the line 2—2 of Figure 1, Figure 3 is a detail view in vertical section of the piston and piston rod of the controller, Figure 4 is a detail view in side elevation of the piston valve, Figure 5 is a detail bottom plan view of the piston, and Figure 6 is a sectional view taken on the horizontal plane indicated by the line 6—6 of Figure 1.

Corresponding and like parts are referred to in the following description, and designated in the several views of the accompanying drawings, by similar reference characters.

In the drawings, 1 designates the front side of the transmission case and 2 the clutch shaft of an automobile. 3 is the rear bearing for the clutch shaft 2. 4 designates the pressure or driven plate of a disk clutch of well known construction and embodying, in addition to the plate, a bushing 5 provided in its rear end with a flange 6, a thrust bearing 7 mounted on the bushing 5 and bearing against the front side of the flange 6, and a clutch release fork 8 mounted upon a shaft 9 and contacting with pins 10 projecting from the bearing 7. The pins 10 slide in guides 11 carried by the front side 1 of the transmission case. The bushing 5 has threaded engagement with the pressure or driven plate 4, and a shim nut 12 is mounted upon the former and contacts with the latter. The clutch is held normally engaged by a spring, not shown, and when engaged the parts shown occupy the positions indicated by solid lines in Figure 1. When the clutch is disengaged the parts occupy the positions shown by dotted lines in Figure 1, and the flanged end of the bushing 5 contacts with the spinning brake 13 carried by the transmission bearing cap 14.

The controller comprises a cylinder 15 which in practice is secured in a vertical position to the outside of a part of the transmission case in perpendicular arrangement to the horizontal axis of the clutch shaft 2. The cylinder 15 is provided with a removable top plate or cover 16 which is secured in place by cap screws 17. The cylinder 15 is provided with dowel pins 18, and the top plate or cover 16 with openings 19 for the reception of the dowel pins. A piston 20 has a snug fit in the cylinder 15 and is hollow. It is provided at its lower side with a conical valve seat 21 and at its upper side with a spider 22. A hollow piston rod 23 is connected to the spider 22 and has a snug sliding fit in a boss 24 formed on and extending upwardly from the top plate or cover 16. The piston 20 is provided with a valve 25 the stem 26 of which extends into an opening 27 in the spider 22. During the down stroke of the piston 20, the valve 25 bears against the seat 21 with the result that the lower side of the piston will be closed. During the up stroke of the piston 20, the valve 25 occupies a downwardly spaced position with respect to the seat 21 with the result that the lower side of the piston will be opened. A pin 28 extending horizontally from the valve stem 26 and working in a vertical slot 29 in the spider 22, movably connects the valve 25 to the piston 20. The valve 25 is provided with a port 30. A lever 31 is keyed at one end to the projecting end of the clutch release fork shaft 9 and is connected at its other end to the piston rod 23 by a clevis 32. The free or that end of the lever 31 connected to the piston rod 23 is provided with an arcuate slot 33 through which a pin 34 carried by the clevis 32 passes. The clevis 32 has an adjustable screw threaded connection with the piston rod 23, and is secured in adjusted position by a lock nut 35.

The cylinder 15 contains a quantity of mercury as indicated by the reference numeral 36. A layer of oil on top of the mercury and indicated by the reference numeral 37 will lubricate the piston 20 and piston rod 23 and prevent oxidation of the mercury. As the piston 20 has a snug fit in the cylinder 15, and as the piston rod 23 has a snug fit in the bearing lug 24, it is not necessary to provide packing rings or the like in order to prevent the mercury from passing between the piston 20 and cylinder 15 and piston rod 23 and bearing lug 24.

When the clutch is fully engaged, the piston 20 occupies a position in the lower end of the cylinder 15, and when the clutch is fully disengaged, the piston 20 occupies a position in the upper end of the cylinder 15. When the clutch is fully engaged, the buoyancy of the mercury causes the submerged piston 20 to exert a force of approximately three pounds on the thrust bearing 7 in a rearward direction, with the result that all rattling will be prevented. When the clutch pedal, not shown, is depressed to effect the disengagement of the clutch, the piston 20 will move upwardly. During this movement of the piston 20, the valve 25 is opened. When the clutch pedal is released to permit the clutch to be engaged by its spring, the piston 20 travels downwardly, and during this movement thereof the valve 25 is closed. It will thus be seen that the controller will offer little or no resistance to the disengaging of the clutch and that the resistance offered to the engagement of the clutch depends upon the cross sectional area of the port 30 in the valve 25. This dimension of the port 30 may be varied to suit the particular requirements of different types of clutches. Any wear in the disks of the clutch and the spinning brake 13 may be taken up by adjusting the clevis 32 with respect to the piston rod 23 and by inserting shims between the pressure or driven plate 4 and nut 12. Mercury is employed for the reason that it freezes at a very low and boils at a very high temperature, for the reason that its rate of expansion and contraction under ordinary temperature conditions is much less than that of any other known liquid, for the reason that it does not become viscous at low temperatures, and for the reason that its average rate of evaporation is much less than that of any other known liquid at any given temperature.

From the foregoing description, taken in connection with the accompanying drawings, it will be seen that the controller will prevent the sudden engagement of the clutch, that it comprises comparatively few parts, and that it may be readily installed and maintained in a high state of efficiency with comparatively little attention and expense. While I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:—

1. A clutch controller comprising, in combination with the release fork of a clutch, a lever connected at one end to the fork and provided at its other end with an arcuate slot, a cylinder containing a liquid, a hollow piston within the cylinder and provided with a piston rod extending beyond the cylinder, a ported valve for the piston, a clevis adjustably connected to the piston rod, and a pin carried by the clevis and passing through the slot of the lever.

2. A clutch controller including a cylinder containing mercury and oil, a hollow piston within the cylinder, and a ported valve for the piston.

3. A clutch controller including a cylinder containing a liquid, a hollow piston within the cylinder and provided at one end with a valve seat and at the other with a spider of which the latter is provided with a central opening and a slot communicating therewith, a piston rod connected to the spider, a ported valve provided with a stem resting in said opening, and a pin carried by the stem and working in said slot.

In testimony whereof I affix my signature.

CLARENCE K. PORTER.